United States Patent
Morichi (10) Patent No.: US 8,781,538 B2
(45) Date of Patent: Jul. 15, 2014

(54) PORTABLE TERMINAL, PORTABLE APPARATUS AND SUPPLY POWER CONTROL METHOD

(75) Inventor: Yoshihisa Morichi, Yokohama (JP)

(73) Assignee: Kyocera Corporation, Kyoto (JP)

( * ) Notice: Subject to any disclaimer, the term of this patent is extended or adjusted under 35 U.S.C. 154(b) by 726 days.

(21) Appl. No.: 12/602,485

(22) PCT Filed: May 20, 2008

(86) PCT No.: PCT/JP2008/059169
§ 371 (c)(1),
(2), (4) Date: Nov. 30, 2009

(87) PCT Pub. No.: WO2008/149658
PCT Pub. Date: Dec. 11, 2008

(65) Prior Publication Data
US 2010/0167797 A1 Jul. 1, 2010

(30) Foreign Application Priority Data
May 30, 2007 (JP) .................................. 2007-143381

(51) Int. Cl.
*H04M 1/00* (2006.01)
(52) U.S. Cl.
USPC ..... 455/574; 455/575.1; 455/573; 455/414.1; 320/116; 320/101; 320/103; 307/77
(58) Field of Classification Search
USPC ................ 455/572–574, 575.1–575.4, 414.1; 327/544, 530; 320/127, 137, 101, 320/116–123
See application file for complete search history.

(56) References Cited

U.S. PATENT DOCUMENTS

| 7,251,509 | B1* | 7/2007 | Wang et al. ............... 455/574 |
| 2004/0204016 | A1* | 10/2004 | Sakamoto ............. 455/550.1 |
| 2005/0061361 | A1* | 3/2005 | Ochi et al. ................ 136/252 |
| 2005/0070334 | A1* | 3/2005 | Ono et al. ................ 455/566 |
| 2005/0282591 | A1* | 12/2005 | Shaff ....................... 455/572 |
| 2006/0113961 | A1* | 6/2006 | Weng ....................... 320/138 |
| 2007/0037610 | A1* | 2/2007 | Logan ...................... 455/574 |
| 2007/0151601 | A1* | 7/2007 | Jung et al. ................ 136/263 |

FOREIGN PATENT DOCUMENTS

| JP | 58-172724 A | 10/1983 |
| JP | 9-107327 | 4/1997 |
| JP | 11-46457 | 2/1999 |
| JP | 11-095849 A | 4/1999 |
| JP | 2000-112545 A | 4/2000 |
| JP | 2000-196492 | 7/2000 |
| JP | 2000-341862 A | 12/2000 |
| JP | 2002-359676 | 12/2002 |

(Continued)

OTHER PUBLICATIONS

Office Action dated Oct. 17, 2013, from corresponding Japanese Patent Application No. 2008-139022 (Statement of Relevance included), 4 total pages.

*Primary Examiner* — Quan M Hua
(74) *Attorney, Agent, or Firm* — Duane Morris LLP (57) ABSTRACT

The cellular phone 100 according to the present invention comprises a plurality of solar cell modules 110 arranged on different surfaces of a casing, a plurality of electric power control parts 132 connected to each of said plurality of solar cell modules 110, a mechanical form detection sensor 120 as a state detection part for detecting a state of said cellular phone 100, and an electric power selection part 134 (FIG. 1).

5 Claims, 9 Drawing Sheets (56) References Cited

FOREIGN PATENT DOCUMENTS

| | | | |
|---|---|---|---|
| JP | 2003-78596 | | 3/2003 |
| JP | 2004-140521 | | 5/2004 |
| JP | 2004-312994 | | 11/2004 |
| JP | 2006101331 | * | 4/2005 |
| JP | 2005-151662 A | | 6/2005 |
| JP | 2005-229673 | | 8/2005 |
| JP | 2005-276942 A | | 10/2005 |
| JP | 2006-101331 | | 4/2006 |
| JP | 2006-211551 | | 8/2006 |
| JP | 2006-229741 | | 8/2006 |
| JP | 2007-058845 A | | 3/2007 |
| JP | 2007-096849 | | 4/2007 |

* cited by examiner

| | MECHANICAL FORM DETECTION SENSOR | | | SOLAR CELL MODULE | | | |
|---|---|---|---|---|---|---|---|
| | OPEN/CLOSE | ROTATION | ACCELERATION SENSOR | 110a | 110b | 110c | 110d |
| FIG. 3A | OPEN | FRONT | UP | O | O | X | X |
| FIG. 3B | OPEN | BACK | UP | X | O | O | X |
| FIG. 3C | OPEN | FRONT | DOWN | X | X | O | O |
| FIG. 3D | OPEN | BACK | DOWN | O | X | X | O |
| FIG. 3E | CLOSE | FRONT | UP | X | X | O | X |
| FIG. 3F | CLOSE | BACK | UP | O | X | X | X |
| FIG. 3G | CLOSE | FRONT | DOWN | X | X | X | O |
| FIG. 3H | CLOSE | BACK | DOWN | X | X | X | O |

PORTABLE TERMINAL, PORTABLE APPARATUS AND SUPPLY POWER CONTROL METHOD

CROSS-REFERENCE TO RELATED APPLICATIONS

This is a U.S. National Phase Application of International Application No. PCT/JP2008/059196 filed May 20, 2008, which claims priority to Japanese Patent Application No. 2007-143381 filed May 30, 2007, the disclosures of which are incorporated herein by reference in their entirety.

TECHNICAL FIELD

The present invention relates to a portable terminal mounted with a plurality of solar cell modules, portable apparatus and a method for controlling electric power supply used by the portable terminal and portable apparatus.

Various portable terminals have been provided recently such as PHS (Personal Handy—Phone System), cellular phones, and PDA (Personal Digital Assistant) etc. These portable terminals are equipped with a display part such as LCD for a display interface, and with a control part such as a plurality of switches (keys) and touch panels, so that a user can easily refer to and input information while outdoors.

Conventionally, portable terminals obtain their electric power for consumption from a battery. Generally, secondary batteries such as a lithium battery, nickel cadmium battery, or nickel hydride battery are adopted as the above stated battery.

However, in recent years, with the advances in technology, the various batteries stated above have are experiencing high functionality wherein the electric power consumption of portable terminals is increasing rapidly due to continuous display of television or game applications for example. Therefore, the supply of electric power is insufficient only with a conventional battery and thus there are calls for improvements in batteries and the adoption of alternative electric power supply means.

Solar cells are devices for converting the light energy of sunlight or illumination into electrical energy. Since there is no depletion of sunlight used as the light in a solar cell, sunlight can be utilized indefinitely. In addition, because a solar cell directly converts light into electrical energy, it is not accompanied by any noise or emission and is thus environmentally friendly. Because the output per cell in a general solar cell is low, around 0.5V, one solar cell module is usually formed by connecting a number of cells in series.

As stated above, because a solar cell is extremely environmentally friendly, does not require maintenance and once installed electric power can be obtained indefinitely, it is attracting attention as a new means of electric power supply. So, even in the technical field of portable terminals, a technology which uses a solar cell module as an auxiliary battery has been proposed (For example, patent document 1)
Patent Document Japan Laid Open Patent 2006-229741

DISCLOSURE OF THE INVENTION

Problems to be Solved by the Invention

However, because a conventional solar cell in a portable terminal stated above is arranged only on a surface on which it is easy to receive light rays from a certain direction during a call, depending on the state of use, that surface is not always directed to the direction of the sun. Therefore, the frequency (probability) with which the solar cell receives sunlight is not high and cases where the solar cell does not function sufficiently as an auxiliary battery of a cellular phone sometimes occur.

In addition, the relationship between output current and voltage which are the electric power generation characteristics of the solar cell, that is, I-V characteristics, change depending on the environmental conditions such as insolation intensity, temperature and spectral distribution of light. Accordingly, in order to optimize the current from a solar cell, it is necessary to always adjust the voltage. In other words, a usual solar cell is provided with an electric power control part connected thereto, which controls the voltage for extracting the maximum amount of electric power based on the I-V characteristics in those occasional environmental conditions.

Therefore, in a conventional portable terminal solar cell the control part which is connected to the solar cell is always operating even when the portable terminal is not used for a call and thus the solar cell hardly receives light. Because this electric power control part consumes electric power which can not be overlooked, the solar cell is not only insufficient as an auxiliary battery but also a cause of increased electric power consumption.

The present invention attempts to solve the above stated problems in a cellular phone with a conventional solar cell module. The object of the present invention is to provide a portable terminal, a portable apparatus and a method for controlling electric power supply, which increase the probability of receiving light by a solar cell module, maximize the function of the solar cell module as an auxiliary battery by not making active the solar cell module which hardly receives light.

Means for Solving the Problems

In order to solves the above stated problems, according to one aspect of the present invention, a portable terminal comprises: a plurality of solar cell modules arranged on different surfaces of a casing and converting light into electric power; a plurality of electric power control parts connected to each of said plurality of solar cell modules, controlling a voltage so that electric power obtained from said plurality of solar cell modules is maximized, and supplying the electric power to said portable terminal; a state detection part for detecting a state of said portable terminal; and an electric power selection part for not making active an electric power control part connected to a solar cell module arranged on a surface, based on the state of said portable terminal detected by said state detection part.

According to the above structure in which solar cell modules are arranged on different surfaces of the casing, it is possible to improve the probability of receiving light by the solar cell modules and indefinitely supply electric power to the portable terminal. Further, the electric power control part enables to obtain maximum electric power from the solar cell modules. In addition, because the state of the portable terminal is detected, it is possible to detect a solar cell module which is arranged on a surface of the portable terminal which is not exposed to a light source. In this way, it is possible not to make active electric power control parts connected to solar cell modules arranged on a surface which is not exposed in the direction of a light source by the electric power selection part. In other words, it is possible to reduce electric power consumption by not using solar cell modules which are not necessary to operate.

Said state detection part may be a mechanical form detection sensor which detects a change in the form of said portable terminal.

According to the above structure, it is possible to structurally detect the form of the portable terminal, for example, open/close state and rotation state. In this way, it is possible to rapidly and easily detect a solar cell module which is arranged on a surface of a portable terminal which hardly receives light.

Said state detection part may be an acceleration sensor which detects acceleration. So, it is possible to detect the vertical direction of a portable terminal just by detecting acceleration with this structure. In this way, it is possible to rapidly and easily detect a surface of a portable terminal which hardly receives light, that is, a solar cell module oriented vertically downward. Therefore, it is possible to indirectly detect a solar cell module arranged on a surface of a portable terminal which is not exposed in the direction of sunlight.

Said state detection part may be an illuminance sensor which detects illuminance. It is possible to detect a solar cell module which is exposed to a light source just by detecting the level of illuminance with this structure. In this way, it is possible to directly detect a solar cell module which is not exposed to the direction of a light source.

In order to solve the above stated problems, according to another aspect of the present invention, a portable terminal comprises: a plurality of solar cell modules arranged on different surfaces of a casing and converting light into electric power; a plurality of electric power control parts connected to each of said plurality of solar cell modules, controlling a voltage so that electric power obtained from said plurality of solar cell modules is maximized, and supplying the electric power to said portable terminal; an electric power measurement part for measuring the electric power supplied from each of said plurality of electric power control parts; and an electric power selection part for not making active an electric power control part in which the electric power measured by said electric power measurement part is below a certain threshold.

According to the above structure, each electric power control part is limitedly operated, a supply electric power is measured, and it is possible not to make active an electric power control part in which the measured supply electric power is below a certain threshold. In this way, if an electric power control part is operated at least once, it is possible to determine whether or not the part consumes wasteful electric power and not to make active the part if so. Therefore, it is possible to reduce the electric power consumed by an electric power control parts which supply electric power less than the certain threshold. In addition, because the state of the cellular phone is changed often, the electric power may be measured every certain time period.

Said plurality of solar cell modules may be transparent solar cell modules comprised of transparent oxide semiconductors through which visible light can pass. According to the above structure, it is possible to arrange a solar cell module even on the display part without affecting the visual aesthetics. Therefore, it is also possible to secure an area on which the solar cell module can be arranged.

In order to solve the above stated problems, according to another aspect of the present invention, a portable apparatus comprises: a plurality of solar cell modules arranged on different surfaces of a casing and converting light into electric power; a plurality of electric power control parts connected to each of said plurality of solar cell modules, controlling a voltage so that electric power obtained from said plurality of solar cell modules is maximized, and supplying the electric power to said portable apparatus; a state detection part for detecting a state of said portable apparatus; and an electric power selection part for not making active an electric power control part connected to a solar cell module arranged on a surface, based on the state of said portable apparatus detected by said state detection part.

In order to solve the above stated problems, according to another aspect of the present invention, a portable apparatus comprises: a plurality of solar cell modules arranged on different surfaces of a casing and converting light into electric power; a plurality of electric power control parts connected to each of said plurality of solar cell modules, controlling a voltage so that electric power obtained from said plurality of solar cell modules is maximized, and supplying the electric power to the portable apparatus; an electric power measurement part for measuring the electric power supplied from each of said plurality of electric power control parts; and an electric power selection part for not making active an electric power control part in which the electric power measured by said electric power measurement part is below a certain threshold.

In order to solve the above stated problems, according to another aspect of the present invention, a method for controlling electric power supply from solar cell modules arranged on different surfaces of a casing of a portable terminal comprises: a photoelectric conversion step for converting light into electric power; an electric power supply step for controlling a voltage so that the electric power converted in said photoelectric conversion step is maximized and for supplying the electric power to the portable terminal; a state detection step for detecting the state of the portable terminal; and an electric power selection step for partially stopping said electric power supply step according as the state of the portable terminal detected in said state detection step.

In order to solve the above stated problems, according to another aspect of the present invention, a method for controlling electric power supply from solar cell modules arranged on different surfaces of a casing of a portable terminal comprises: a photoelectric conversion step for converting light into electric power; an electric power supply step for controlling a voltage so that the electric power converted in said photoelectric conversion step is maximized and for supplying the electric power to the portable terminal; an electric power measurement step for measuring the electric power supplied in said electric power supply step; and an electric power selection step for partially stopping said electric power supply step according as the electric power measured in said electric power measurement step.

In order to solve the above stated problems, according to another aspect of the present invention, a method for controlling electric power supply from solar cell modules arranged on different surfaces of a casing of a portable apparatus comprises: a photoelectric conversion step for converting light into electric power; an electric power supply step for controlling a voltage so that the electric power converted in said photoelectric conversion step is maximized and for supplying the electric power to the portable apparatus; a state detection step for detecting the state of the portable apparatus; and an electric power selection step for partially stopping said electric power supply step according as the state of the portable apparatus detected in said state detection step.

In order to solve the above stated problems, according to another aspect of the present invention, a method for controlling electric power supply from solar cell modules arranged on different surfaces of a casing of a portable apparatus comprises: a photoelectric conversion step for converting light into electric power; an electric power supply step for controlling a voltage so that the electric power converted in said photoelectric conversion step is maximized and for supplying the electric power to the portable apparatus; an electric power measurement step for measuring the electric power supplied in said electric power supply step; and an electric power selection step for partially stopping said electric power supply step according as the electric power measured in said electric power measurement step.

The constituent elements and their explanations based on the technological idea of the portable terminal described above can also be applied to the portable apparatus and the method for controlling electric power supply.

Effects Of The Invention

According to the portable terminal of the present invention as explained above, it is possible to increase the probability of receiving light by a solar cell module and to maximize the function of the solar cell module as an auxiliary battery by not making active the solar cell module which hardly receives light.

EXPLANATION OF THE SYMBOLS 100, 200 cellular phone
110 solar cell module
120 mechanical form detection sensor
122 biaxial hinge
124 acceleration sensor
126 illuminance sensor
130, 230 terminal control part
132 electric power control part
134 electric power selection part
140 memory
142 display part
144 operation part
146 voice input part
148 voice output part
150 camera part
152 wireless communication part 200 cellular phone
202 electric power measurement part

BEST MODE FOR REALIZING THE INVENTION

The preferred embodiments of the present invention will be explained in detail below while referring to the accompanying drawings. Furthermore, because the same symbols are attached to the constituent elements which have essentially the same functional structure, overlapping explanations are omitted.

(First Embodiment)

Generally, in a cellular phone mounted with a solar cell, the solar cell and an electric power control part which controls the electric power of the cell act together as a pair of electronic circuits. So, the electric power control part always operates with the solar cell, even when the amount of light received by the solar cell is small because of a place where the cellular phone is stored and of a state how the cellular phone is grasped. In order to control electric power generated by the solar cell, the electric power control part sometimes consumes electric power more than that generated by the solar cell. In this case the solar cell is insufficient as an auxiliary battery and therefore electric power consumption is increased.

A portable terminal and a method for controlling electric power supply according to the present embodiment can increase the probability of receiving light by a solar cell module and maximize the function of a solar cell module as an auxiliary battery by not making active the solar cell module which hardly receives light. A cellular phone is used as a portable terminal for the purposes of explanation in the following. However, the portable terminal is not limited to a cellular phone but may be various ones such as a PHS or PDA.

(Cellular Phone 100)

Figure 1A:
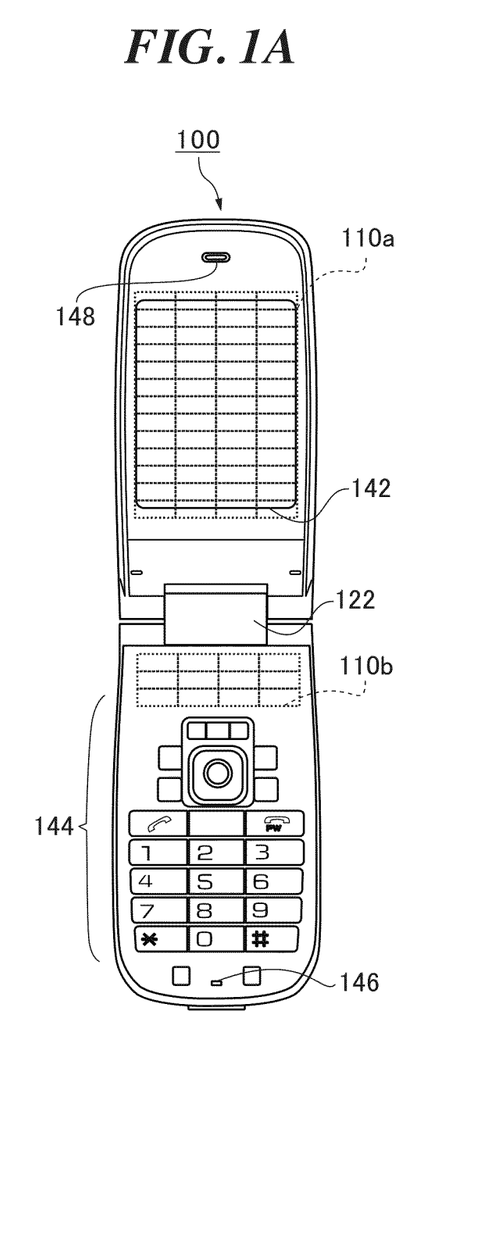
FIGS. 1A and 1B are perspective views of a cellular phone related to a first embodiment.
Figure 1B:
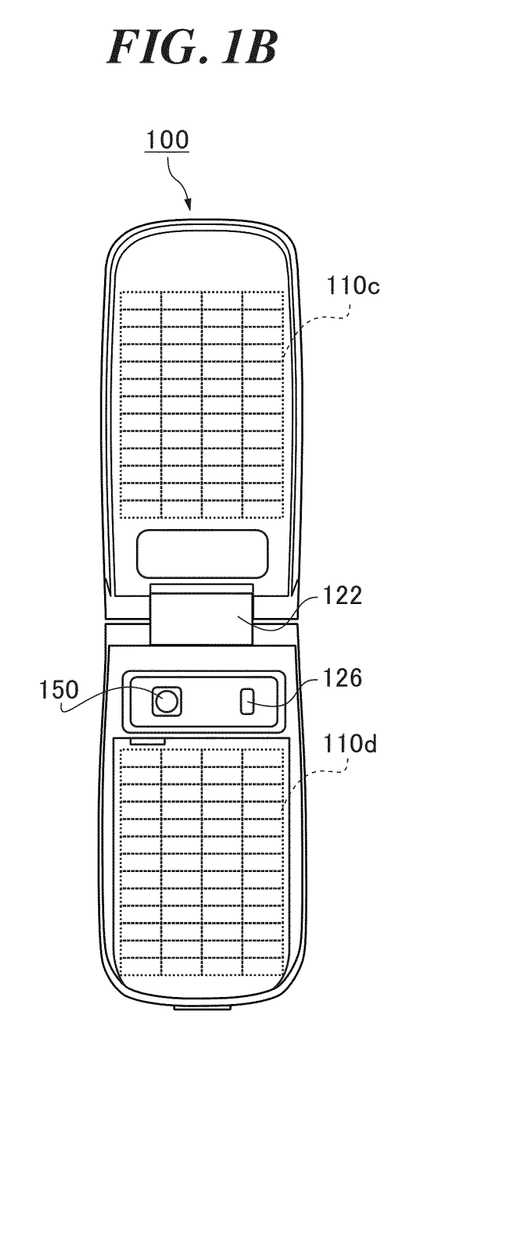
Figure 2:
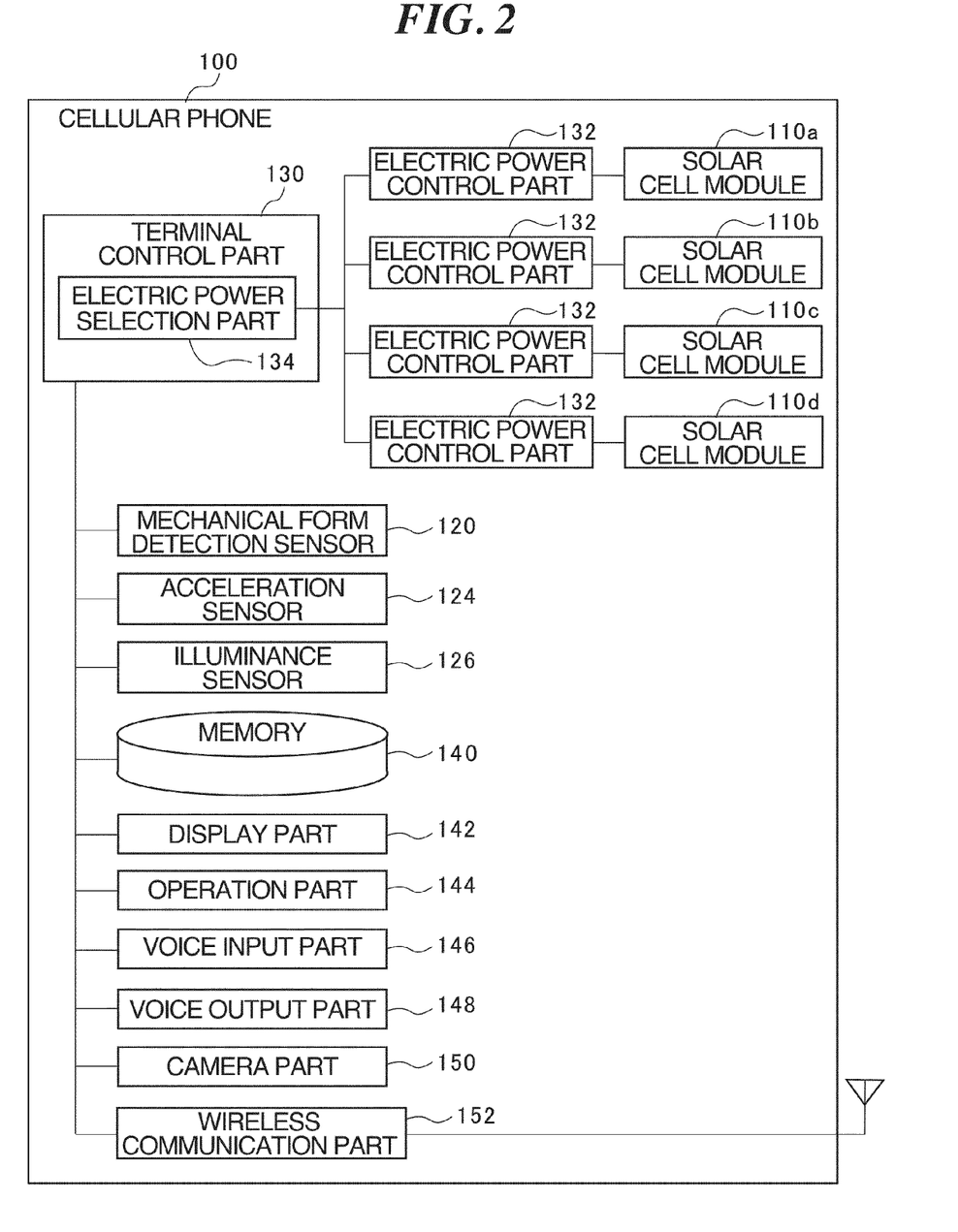
FIG. 2 is a function block diagram which shows the approximate functions of the cellular phone related to the first embodiment.

FIGS. 1A and 1B are perspective views of a cellular phone 100 and FIG. 2 is a function block diagram which shows the approximate functions of the cellular phone 100. The cellular phone 100 is a folding type phone and is comprised of four solar cell modules 110a, 110b, 110c and 110d (commonly referred to below as solar cell modules 110), an illuminance sensor 126, a mechanical form detection sensor 120 used as a state detection part, an acceleration sensor 124 used as a state detection part, a terminal control part 130, an electric power control part 132, a memory 140, a display part 142, an operation part 144, a voice input part 146, a voice output part 148, a camera part 150 and a wireless communication part 152.

As is shown in FIGS. 1A and 1B, four solar cell modules 110 are arranged on different surfaces of the casing. Specifically, as is shown in FIG. 1A the solar cell module 110a is arranged on the surface on which the display part 142 is arranged, and the solar cell module 110b is arranged on the surface on which the operation part 144 is arranged. In addition, as is shown in FIG. 1B, the solar cell module 110c is arranged on the rear side (outside) of the surface on which the display part 142 is arranged, and the solar cell module 110d is arranged on the rear side (outside) of the surface on which the operation part 144 is arranged, and the camera 150 is also arranged on this surface.

Here, different surfaces mean surfaces differently oriented relative to a light source, independent surfaces differently positioned relative to one another, or surfaces of different normal directions. For example, the top and bottom surfaces of the casing are different surfaces. In the case where the casing has a straight shape then there are only two different surfaces, top and bottom surfaces, however, in the case of a folding type, there are four surfaces. The four surfaces are on the top and bottom respectively of a first casing provided with the operation part and of a second casing provided with the display part. A plurality of different surfaces can be positioned on almost the same plane when opening the casing of a folding type cellular phone.

The solar cell modules 110 directly convert sunlight or illumination into electric power. In the present embodiment, at least the solar cell module 110 of the display part 142 is formed by transparent solar cell module created by transparent oxide semiconductors through which visible light can pass. In this way, it is possible to arrange a solar cell module even on the display part 142 without affecting the visual aesthetics. Therefore, it is also possible to secure an area on which the solar cell module can be arranged.

An opaque solar cell module such as a silicon crystal type, amorphous silicon type or compound semiconductor type may be preferably used as the solar cell modules 110 arranged on parts other than the display part 142 of the present embodiment.

The solar cell modules 110a-110d are arranged on four different surfaces in the present embodiment, however, they do not have to be arranged on all the surfaces on which a solar cell module can be arranged. It is possible to selectively arrange the solar cell modules on two or more surfaces. It is difficult to arrange the solar cell modules 110 on a side surface due to the thin type of casing in recent years. However, a solar cell module may be arranged on a side surface of the casing in the case where the casing is slightly thick, and in the case where the solar cell modules 110 have a high efficiency and it is possible to obtain sufficient electric power even with a small area. In addition, a plurality of solar cell modules 110 can be arranged on the same surface in the case where the surface has an sufficient area more than a required area for the solar cell modules 110.

By arranging a plurality of solar cell modules 110 on different surfaces of the cellular phone 100, it is possible to receive light on whichever one of the surfaces of the phone 100 no matter how the phone 100 is oriented relative to a light source. Therefore, it is possible to improve the light receiving probability of the solar cell modules 110 and continuously supply electric power to the cellular phone 100.

The mechanical form detection sensor 120 detects the state of form of the cellular phone 100, in the case where the phone 100 has movable mechanisms. The detection sensor 120 may be a limit switch arranged on the biaxial hinge 122, a magnetic sensor or an encoder which detects the angle of rotation, or a magnetic type open/close sensor such as a hole element arranged on the tip of a casing which can open and close.

By detecting the form (open/close state and rotation state) of the cellular phone 100 as stated above and by considering the normal usage manner of the phone 100, it is possible to determine which surface of the phone 100 is likely to receive light and which surface of the phone 100 is not likely to do so, with a certain amount of reliability. Therefore, it is possible to rapidly and easily detect a solar cell module arranged on a surface of the cellular phone 100 which hardly receives light. In other words, it is possible to indirectly detect a solar cell module arranged on a surface of the cellular phone 100 which is not exposed in the direction of sunlight.

The acceleration sensor 124 is comprised of a piezoresistive MEMS (Micro Electro Mechanical System) acceleration sensor and detects the vertical direction from the obtained waveform. So, it is possible to detect the vertical direction of the cellular phone 100 by just detecting acceleration and it is possible to predict the direction of a light source with respect to gravity. Therefore, it is possible to rapidly and easily detect a surface of the portable terminal 100 which is oriented vertically downward and therefore hardly receives light, and a solar cell module arranged on such a surface. In this way, the acceleration sensor 124 can indirectly detect the solar cell module which is arranged on a surface of the cellular phone 100 which is not exposed in the direction of sunlight, as well as the mechanical form detection sensor 120.

The acceleration sensor 124 of the present embodiment uses a piezoresistive type. However, a capacitance type or a thermal detection type acceleration sensor may also be preferably used.

The cellular phone 100 can be provided with either one of the mechanical form detection sensor 120 or the acceleration sensor 124 described above. However, when providing both of them with the cellular phone 100, the accuracy of determining a surface of the cellular phone 100 for solely receiving light is improved. For example, by using the mechanical form detection sensor 120, it is possible to distinguish between a solar cell module on an exterior surface and a solar cell module on an interior surface of a folded casing, among the plurality of solar cell modules 110. In addition, because it is possible to obtain the vertical direction using the acceleration sensor 124, it is possible to estimate the direction toward a light source under the assumption that light usually irradiates from above. By combining these detection results, it is possible to estimate a solar cell module which is for solely receiving light with a high degree of accuracy.

The terminal control part 130 manages and controls the entire cellular phone 100 by a semiconductor integrated circuit which includes a central processing unit (CPU). The terminal control part 130 uses a program stored in the memory 140 described below and implements a call function or mail delivery function using the cellular phone 100.

In addition, the terminal control part 130 also functions as the electric power selection part 134 described below.

The electric power control part 132 is connected to each solar cell module 110. The electric power control part 132 supplies electric power to the cellular phone 100 and automatically controls a voltage so that the electric power obtained from the solar cell modules 110 is maximized. Specifically, the voltage is controlled using a DC-DC converter i.e. a voltage converter. In this way, it is possible to obtain maximized electric power from the solar cell modules 110.

The electric power selection part 134 turns on or off the electric power control part 132 which is connected to a solar cell module 110 arranged on a surface, which is not exposed to the direction of a light source, detected by the mechanical form detection sensor 120 and the acceleration sensor 124. In this way, it is possible to eliminate the electric power consumption of an electric power control part 132 which is connected to a solar cell module 110 which generates a small amount of electric power.

In addition, the electric power selection part 134 may be adapted to keep not making active an electric power control part 132 connected to a solar cell module 110 arranged on a surface while the surface is not exposed in the direction of a light source. When a user changes the state of the cellular phone 100 and it is detected that the above-mentioned solar cell module 110 is exposed in the direction of a light source by the mechanical form detection sensor 120 and the acceleration sensor 124, the electric power selection part 134 turns on again the electric power control part 132 which has been turned off.

Figure 3A:
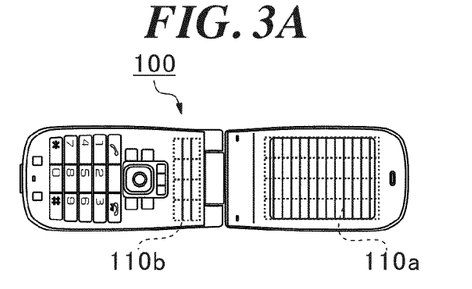
FIGS. 3A to 3H are top views of each state of the cellular phone related to the first embodiment.
Figure 3B:
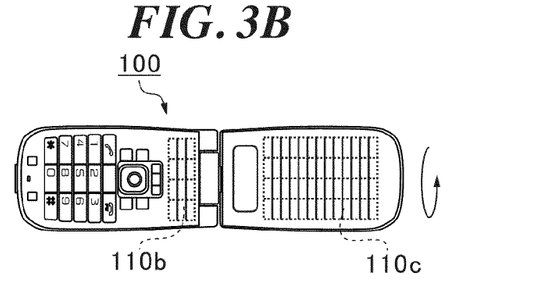
Figure 3C:
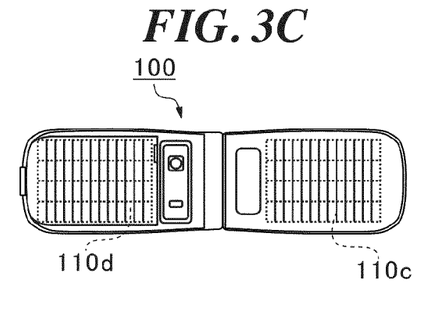
Figure 3D:
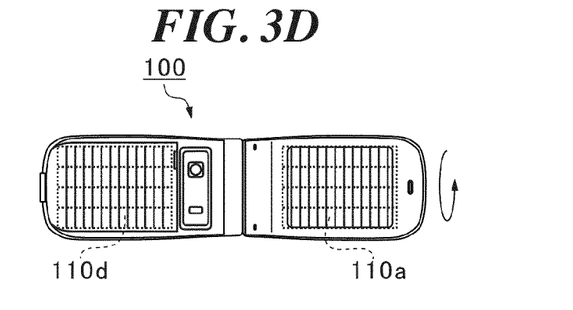
Figure 3E:
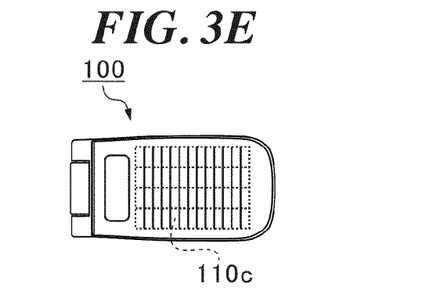
Figure 3F:
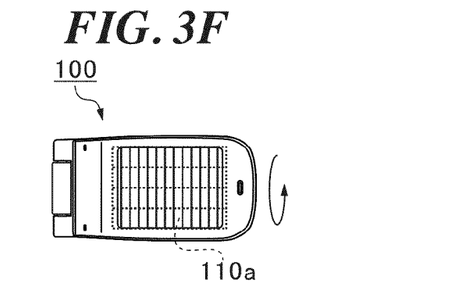
Figure 3G:
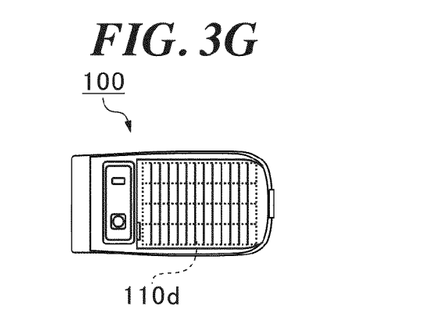
Figure 3H:
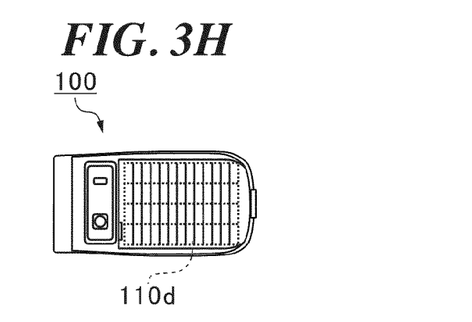
Figure 4:
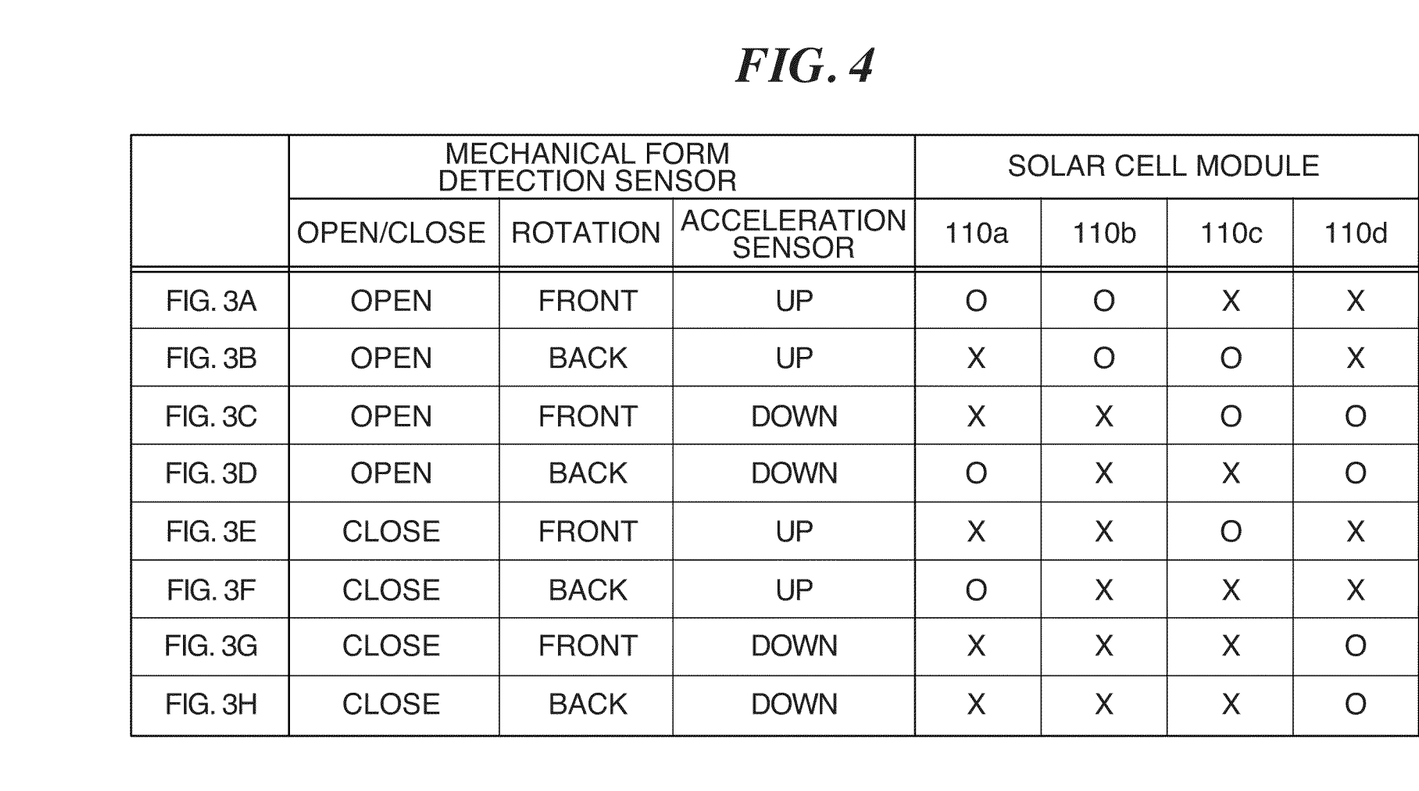
FIG. 4 is a chart of a drive mode of an electric power control part corresponding to the state of the cellular phone shown in FIGS. 3A to 3H.

FIGS. 3A to 3H are top views of each state of the cellular phone 100 and FIG. 4 is a chart of a drive mode of an electric power control part 132 corresponding to the state of the cellular phone 100 shown in FIGS. 3A to 3H. In the present embodiment, a light source is sunlight and is located in the vertical upward direction from the cellular phone 100.

The mechanical form detection sensor 120 of the present embodiment detects an open state of the cellular phone 100 as "open" and a close state as "close." The sensor 120 also detects the rotation state of the display part 142 as "front" when the display part 142 is located on the same side as the operation part 144 or as "back" when the display part 142 is located on the opposite side of the operation part 144. The acceleration sensor 124 of the present embodiment detects the state of the operation part 144 as "up" when the operation part 144 is oriented vertically upward or as "down" when the operation part 144 is oriented vertically downward.

As is shown in FIG. 3A, the mechanical form detection sensor 120 and the acceleration sensor 124 detect that the solar cell modules 110a and 110b are oriented vertically upward, that is, toward the light source, and indirectly detect that the solar cell modules 110c and 110d are not oriented toward the light source. Accordingly, the electric power selection part 134 does not makes active the electric power control parts 132 connected to the solar cell modules 110c and 110d which generate a small amount of electric power, and turns on the electric power control parts 132 connected to the solar cell modules 110a and 110b which generate a large amount of electric power.

In the same way as explained with reference to FIG. 3A, the solar cell modules 110b and 110c in FIG. 3B, the solar cell modules 110c and 110d in FIG. 3C, the solar cell module 110a and 110d in FIG. 3D, the solar cell module 110c in FIG. 3E, the solar cell module 110a in FIG. 3F, the solar cell module 110d in FIG. 3G and FIG. 3H are determined to be oriented toward the light source by the mechanical form detection sensor 120 and the acceleration sensor 124. Based on those results, the electric power selection part 134 does not make active electric power control parts 132 connected to solar cell modules 110 which generate a small amount of electric power and turns on electric power control parts 132 connected to solar cell modules 110 which generate a large amount of electric power.

A circle in FIG. 4 indicates that it is assumed that the corresponding solar cell module 110 is oriented toward a light source and an X indicates that it is assumed that the corresponding solar cell module 110 is not oriented toward a light source. Therefore, the electric power selection part 134 turns on electric power control parts 132 connected to solar cell modules 110 indicated by circles, and does not make active electric power control parts 132 connected to solar cell modules 110 indicated by X. That is, the electric power selection part 134 does not make active electric power control parts 132 connected to solar cell modules 110 which generate a small amount of electric power and turns on electric power control parts 132 connected to solar cell modules 110 which generate a large amount of electric power.

The memory 140 is comprised of a ROM, RAM, E²PROM, nonvolatile RAM, flash memory or HDD and stores a program etc processed by the terminal control part 130.

The display part 142 is comprised of a color or monochrome display such as LCD or OLED (organic EL) and it is possible to display a web browser or application GUI (Graphical User Interface) which is stored in the memory or provided from an application server (not shown in the figures) via a communication network.

The operation part 144 is comprised of a switch such as a keyboard, arrow key or joystick and receives operation inputs from a user.

The voice input part 146 converts the voice of a user of the cellular phone 100 which is input during a call via a microphone into a voice signal.

The voice output part 148 converts the voice signal into voice and outputs via a speaker. In addition, the voice output part 148 can also output a ringtone or a tone of an operation by the operation part 144 or an alarm.

The camera part 150 is comprised of an imaging element such as CCD (Charge Couple Device) or CMOS (Complementary Metal Oxide Semiconductor) and a user can take still shots or video.

The wireless communication part 152 performs wireless communication with a base station in the cellular phone network. As a wireless communication method, there is a time division multiplex method in which communication is performed by a plurality of time slots in which frames are time divided at the base station each being allocated to a cellular phone channel.

(Method for Controlling Electric Power Supply)

Next, a method for controlling electric power supply in which the cellular phone 100 described above receives an electric power supply from a light source is explained.

Figure 5:
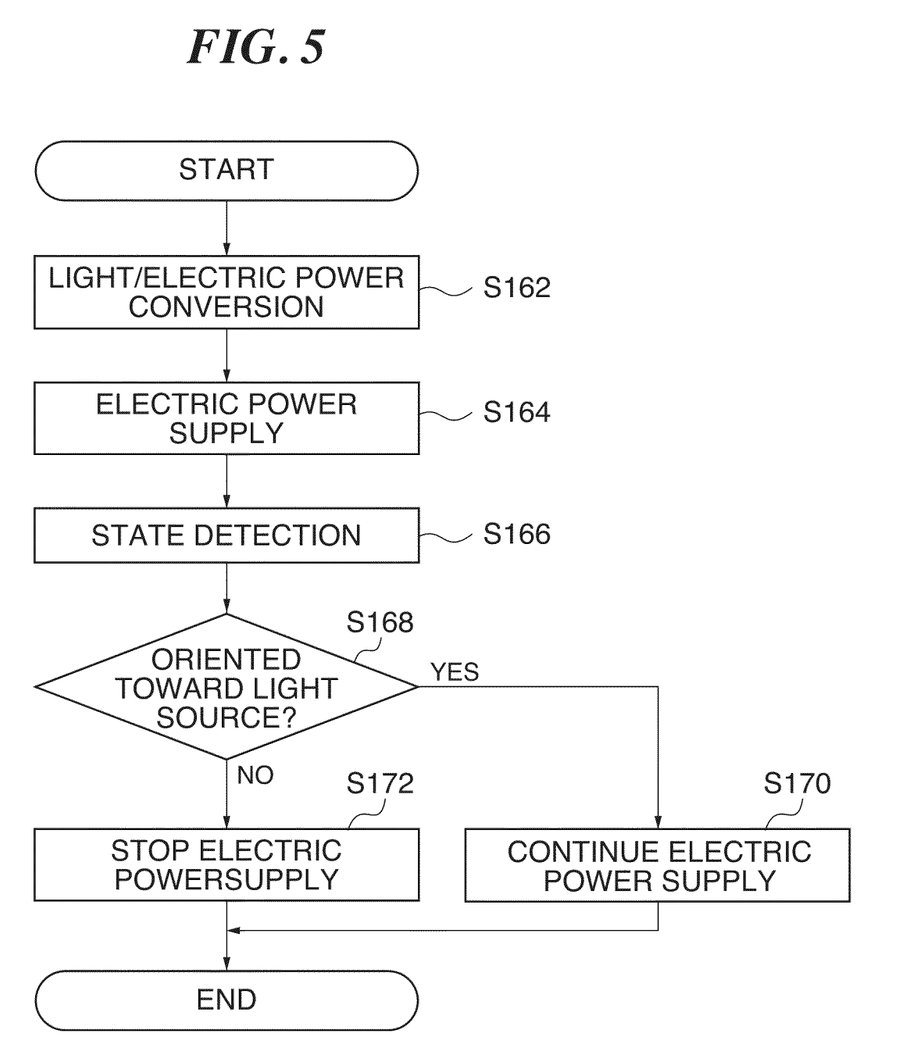
FIG. 5 is a flowchart which shows the process flow of a method for controlling electric power supply related to the first embodiment.

FIG. 5 is a flowchart which shows the process flow of a method for controlling electric power supply. First, the solar cell modules 110 arranged on the cellular phone 100 receive light and the received light is converted into electric power (step S162 for light/electric power conversion). Next, a voltage is controlled so that the converted electric power is maximized and the controlled electric power is supplied to the cellular phone 100 (step S164 for electric power supply).

The state of the cellular phone 100 is detected (step S166 for state detection) and it is determined which solar cell module 110 is oriented toward a light source according as the state of the cellular phone 100 detected in the state detection step S166 (step S168 for determination of light source direction). In the step 168 for determination of light source direction, the electric power supply step is continued with regards to a solar cell module 110 which is determined to be oriented toward a light source (step S170 to continue electric power supply), and the electric power supply step 164 is stopped for a solar cell module 110 which is determined not to be oriented toward a light source (step S172 to stop electric power supply).

In this way, it is possible to detect a solar cell module 110 arranged on a surface of the cellular phone 100 that is not exposed to a light source. In addition, because it is possible to stop electric power supply to the solar cell module 110 arranged on the surface that is not exposed to a light source by the step S172 to stop electric power supply, it is possible to eliminate the electric power consumed in the step for electric power supply to the solar cell module 110 which generates a small amount of electric power.

As explained above, by the structure of the apparatus and method of the embodiment, it is possible to increase the probability of receiving light by a solar cell module and maximize the function of a solar cell module as an auxiliary battery by not making active the solar cell module which hardly receives light.

In this way, it is possible to significantly reduce the amount of electric power wasted by an electric power control part 132 connected to a solar cell module 110 which generates a small amount of electric power.

In the embodiment described above, a folding type cellular phone was given as an example of a portable terminal. However, the cellular phone is not limited to this type. Other forms of portable terminal to which the present embodiment can be applied are exemplified below.

Figure 6A:
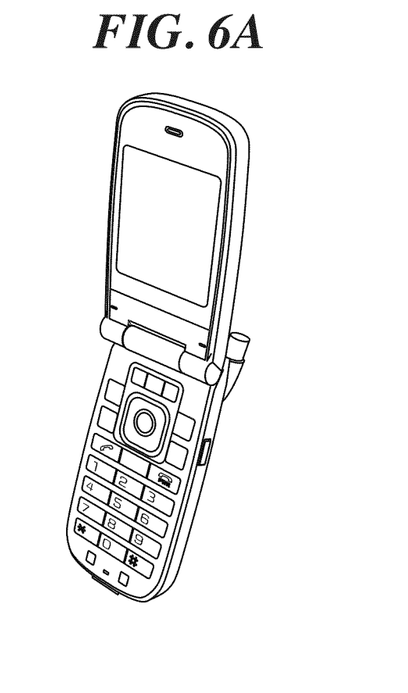
FIGS. 6A to 6D are diagrams which show form examples of a cellular phone other than the cellular phone of the first embodiment.
Figure 6B:
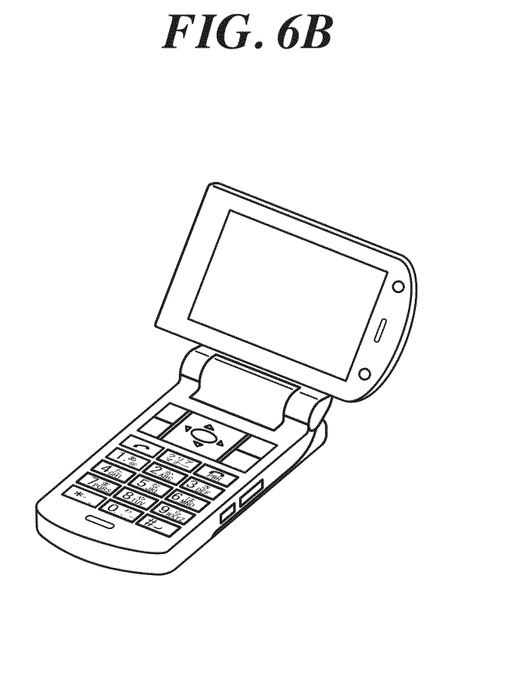
Figure 6C:
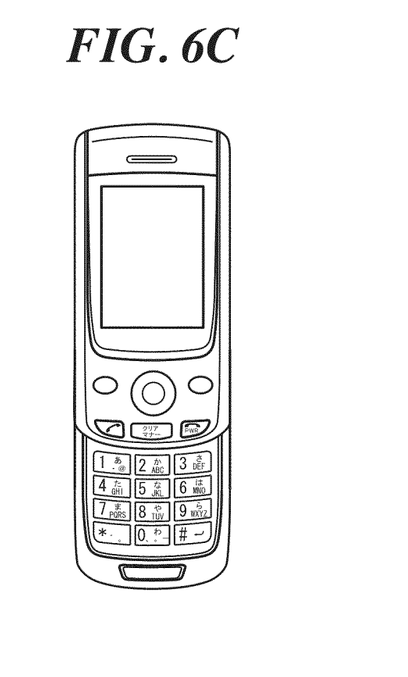
Figure 6D:
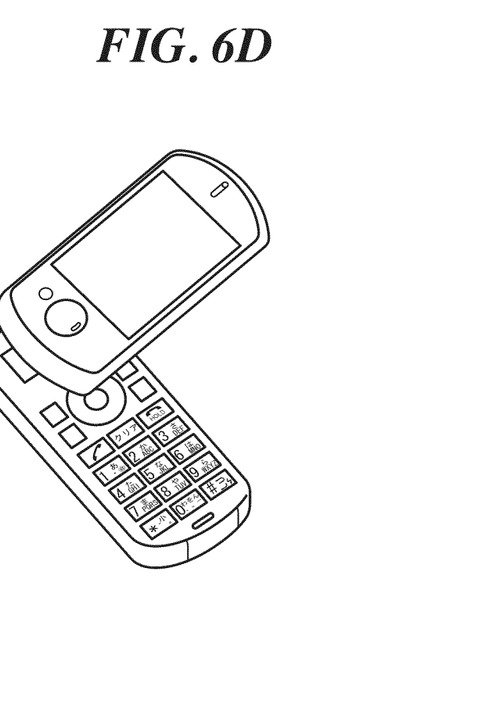

FIGS. 6A to 6D are diagrams which show form examples of a cellular phone other than the cellular phone of the first embodiment. FIG. 6A is a folding type portable terminal having a single axis hinge, FIG. 6B is a display surface rotation type portable terminal, FIG. 6C is a slide type portable terminal and FIG. 6D is a revolving type portable terminal. It is possible to arrange the solar cell modules 110 on a plurality of arbitrary surfaces of the portable terminals in FIGS. 6A to 6D. In addition, it is possible to apply the present invention to a flip type or straight type, swing type, or dual open type form of portable terminal other than the portable terminal exemplified in FIGS. 6A to 6D.

In the present embodiment, the mechanical form detection sensor 120 and acceleration sensor 124 are used as a state detection part. However, either one of them may be used. In addition, the illuminance sensor 126 such as a photo diode type, photo transistor type or photo IC type may be used as a state detection sensor. The illuminance sensor 126 is often arranged on the existing component such as camera part 150. In addition, the illuminance sensor 126 can be preferably arranged near to each of the solar cell modules 110. In this way, it is possible to detect a solar cell module 110 which is exposed to a light source just by detecting illuminance. In addition, the illuminance sensor 126 may be arranged on the top and bottom surfaces of the casing and may be used in combination with the form state described above. In that case, it would be possible to determine a solar cell module 110 exposed to light, with suitable amount of possibility. Therefore, it would be possible to indirectly detect a solar cell module 110 which is not exposed in the direction of a light source. The illuminance sensor 126 may be arranged near the camera part 150 and can also be used when taking images at night or indoors.

In the case where the illuminance sensor 126 is arranged, the electric power control part 132 can be turned on and off based on the illuminance detected by the illuminance sensor 126. Because the illuminance sensor 126 can detect a surface actually receiving light, it is possible to detect with certainty a solar cell module which is generating electric power and more effectively perform the above described electric power control.

(Second Embodiment)

The portable terminal according to the first embodiment uses the state detection part in order to detect a solar cell module arranged on a surface that is not exposed to a light source. However, it is also possible to determine the necessity of each electric power control part by once turning on the each electric power control part and by measuring the amount of electric power generated thereby. A second embodiment of the portable terminal will be explained below, as it is adopted to do the above stated method. Here, a cellular phone is used as a portable terminal for the purposes of explanation in the following. However, the portable terminal is not limited to a cellular phone but may be various ones such as a PHS or PDA.

(Cellular Phone 200)

Figure 7:
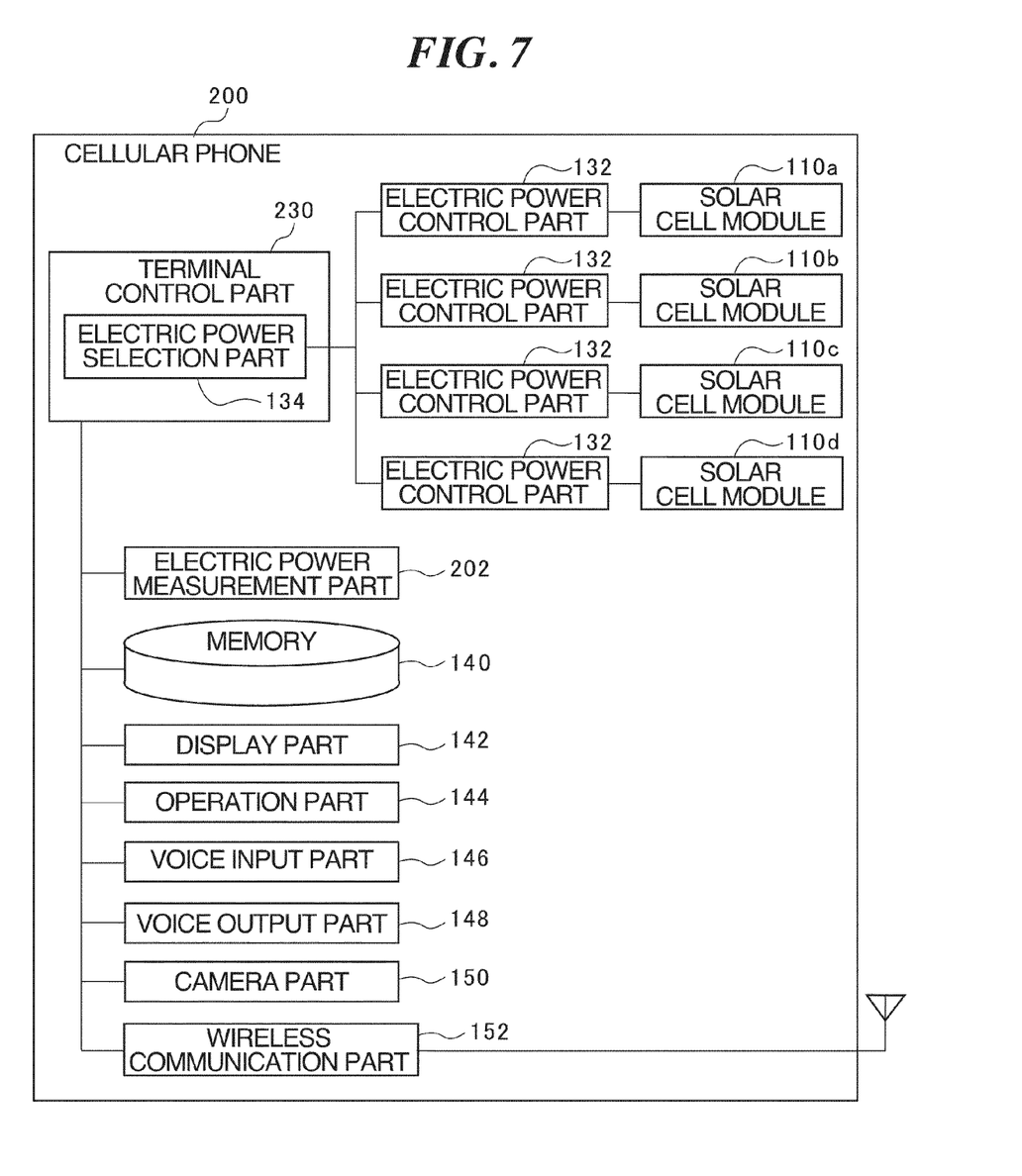
FIG. 7 is a function block diagram which shows the approximate functions of a cellular phone according to a second embodiment.

FIG. 7 is a function block diagram which shows the approximate functions of a cellular phone 200 according to the second embodiment. The cellular phone 200 is a folding type cellular phone and is comprised of four solar cell modules 110a, 110b, 110c and 110d, a terminal control part 230, electric power control parts 132, an electric power measurement part 202, a memory 140, a display part 142, an operation part 144, a voice input part 146, a voice output part 148, a camera part 150 and a wireless communication part 152. The structural components which have the functions essentially equivalent to those of the first embodiment are indicated with the same symbols, and overlapping explanations are omitted.

The terminal control part 230 manages and controls the entire cellular phone 200 by a semiconductor integrated circuit which includes a central processing unit (CPU). The terminal control part 230 uses a program stored in the memory 140 described below and implements a call function or mail delivery function using the cellular phone 200.

In addition, the terminal control part 230 also functions as the electric power selection part 134 described below.

The electric power measurement part 202 is adopted to measure the electric power supplied from each of a plurality of electric power control parts 132. Because the state of the cellular phone 200 is changed often, the electric power may be measured every certain time period.

The electric power selection part 134 does not make active an electric power control part 132 in which the electric power measured by the electric power measurement part 202 is below a certain threshold. As stated above, by turning on an electric power control part 132 at least once, it is possible to determine whether or not the part 132 consumes wasteful electric power and not to make active the part 132 if so. Therefore, it is possible to reduce the electric power consumed by electric power control parts 132 which supply electric power less than the certain threshold.

(Method for Controlling Electric Power Supply)

Next, a method for controlling electric power supply whereby the cellular phone 200 described above receives an electric power supply from a light source is explained.

Figure 8:
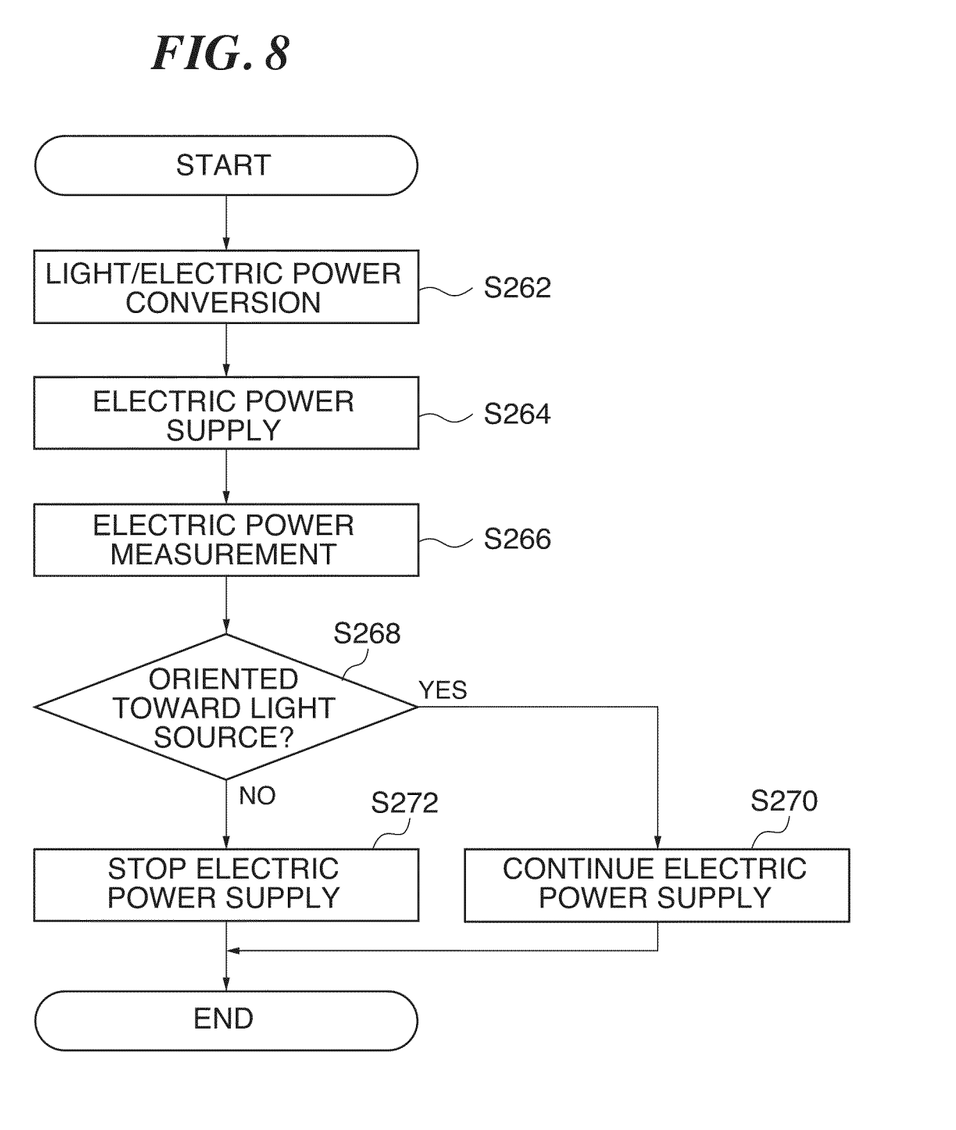
FIG. 8 is a flowchart which shows the process flow of a method for controlling electric power supply according to the second embodiment.

FIG. 8 is a flowchart which shows the process flow of a method for controlling electric power supply. First, the solar cell modules 110 arranged on the cellular phone 200 receive light and the received light is converted into electric power (step S262 for light/electric power conversion). Next, a voltage is controlled so that the converted electric power is maximized and the controlled electric power is supplied to the cellular phone 200 (step S264 for electric power supply).

The electric power supplied in the electric power supply step S264 is measured (step S266 for electric power measurement) and it is determined which solar cell module 110 is oriented toward a light source according as the electric power measured (step S268 for determination of light source direction). In the step S268 for determination of light source direction, the electric power supply step is continued with regards to a solar cell module 110 which is determined to be oriented toward a light source (step S270 to continue electric power supply), and the electric power supply step S264 is stopped for a solar cell module 110 which is determined not to be oriented toward a light source (step S272 to stop electric power supply).

In this way, for each electric power control unit 132, electric power supply step S264 is carried out and electric power supply is measured. Then it is possible to stop electric power supply step S264 for an electric power control unit 132 if the measured electric power is below the certain threshold. Therefore, if the electric power supply step S264 is carried out at least once, it is possible to determine whether or not the electric power supply step S264 consumes wasteful electric power. In other words, it is possible to reduce the electric power consumed by the electric power supply step S264 which generates electric power below the certain threshold. In addition, because the state of the cellular phone 200 is changed often, the electric power may be measured by the step S266 every certain time period.

(Third Embodiment)

A portable terminal is used as an example in the embodiments stated above, however, the present invention can also be applied to a portable apparatus. In the present embodiment, a portable apparatus is assumed to be an electronic apparatus which is comparatively larger than a portable terminal, can be carried and operated by a battery installed within the apparatus. Below, a portable apparatus according to the present embodiment is exemplified.

Figure 9A:
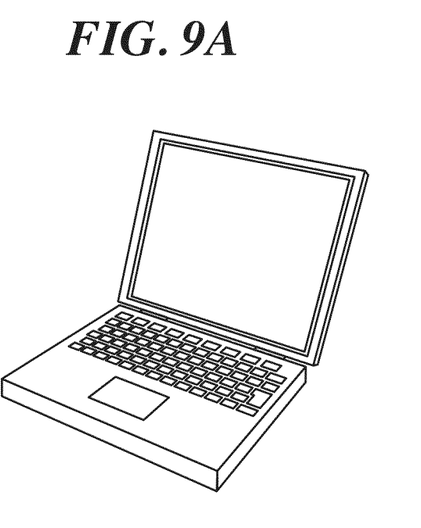
FIGS. 9A to 9C are diagrams which shows an example of a portable apparatus related to a third embodiment.
Figure 9B:
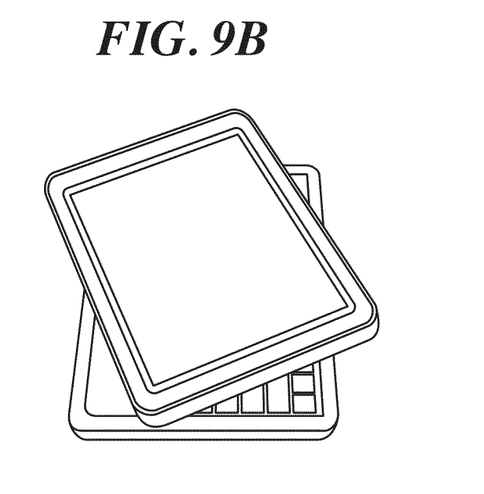
Figure 9C:
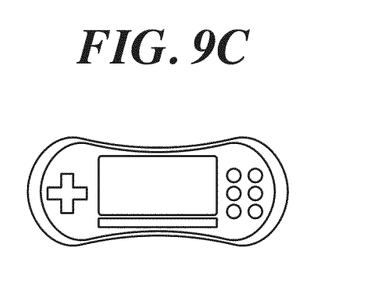

FIG. 9 is a diagram which shows an example of a portable apparatus related to a third embodiment. As the portable apparatus, FIG. 9A shows a note type computer, FIG. 9B shows a tablet type computer and FIG. 9C shows a mobile game device. It is possible to arrange solar cell modules in a plurality of arbitrary places (surfaces) in the portable apparatus shown in FIGS. 9A to 9C. In addition, it is also possible to apply the present embodiment to portable apparatus, other than those shown in FIGS. 9A to 9C, such as a mobile metal detector or a mobile analyzing device.

The preferred embodiments of the present invention are explained above while referring to the accompanying drawings. However, the present invention is not limited to these examples. In addition, numerous modifications and variations could be made by a person skilled in the art without departing from the scope of the invention set forth in the claims and is should be understand that these belong to the technical scope of the present invention.

For example, the state detection part in the embodiments stated above is explained as structured by one or a plurality of mechanical form detection sensor, acceleration sensor and illuminance sensor. However, the present invention is not limited to those examples but can be provided with a GPS (Global Positioning System), a compass and an accurate clock may also be arranged. In this way, the position of the sun and the orientation of the user's portable terminal relative to the solar light source can be confirmed and therefore it is possible to allow the solar cell module arranged on the portable terminal to receive an appropriate amount of sunlight.

In the embodiments described above, it is explained that an electric power control part is connected to each solar cell. However, in the case where a plurality of solar cell modules are arranged on the same surface, one electric power control part may be connected to the plurality of solar cell modules arranged on this same surface.

Furthermore, each process in the method for controlling electric power supply of this specification is not always required to be carried out in chronological order in the sequence described in the flow charts. The processes may be carried out in parallel or individually (for example, parallel processes or processes according to the object).

Industrial Application of the Invention

The present invention can be applied to a portable terminal mounted with a plurality of solar cell modules, portable apparatus and a method for controlling electric power supply used by the portable terminal and portable apparatus.

What is claimed is:

1. A portable terminal comprising:
   first and second solar cell modules arranged on different surfaces of a casing and converting light into electric power, wherein each solar cell module includes an array of solar cells;
   first and second electric power control parts connected to each of said of first and second solar cell modules respectively, which control a voltage so that electric power obtained from said plurality of first and second solar cell modules is maximized, and supplies the electric power to said portable terminal;
   a state detection part comprising a mechanical form sensor or an acceleration sensor or an illuminance sensor, configured to identify a current orientation of the portable terminal in response to a change in orientation, and determine which of the first and second solar cell is facing vertically upward based on said identified orientation; and
   an electric power selection part that is coupled to the state detection part, wherein the electric power selection part deactivates the electric power control part of the corresponding solar cell module that is determined as not facing vertically upward and activates the electric power control part of the corresponding solar cell module that is determined as not facing vertically upward using the determination result received from the state detection part.

2. The portable terminal according to claim 1, wherein said first and second of solar cell modules are transparent solar cell modules comprised of transparent oxide semiconductors through which visible light can pass.

3. A portable apparatus comprising:
   first and second solar cell modules arranged on different surfaces of a casing and converting light into electric power, wherein each solar cell module comprises an array of solar cells;
   first and second electric power control parts connected to each of said first and second solar cell modules respectively, which control a voltage so that electric power obtained from said of first and second solar cell modules is maximized, and supplies the electric power to said portable apparatus;
   a state detection part comprising a mechanical form sensor, an acceleration sensor, or an illuminance sensor, configured to identify a current orientation of the portable terminal in response to a change in orientation, and to determine which of the first and second solar cell is facing vertically upward based on said identified orientation; and
   an electric power selection part that is coupled to the state detection part, wherein the electric power selection part deactivates the electric power control part of the corresponding solar cell module that is determined as not facing vertically upward and activates the electric power control part of the corresponding solar cell module that is determined as not facing vertically upward using the determination result received from the state detection part.

4. A method for controlling electric power supply from first and second solar cell modules arranged on different surfaces of a casing of a portable terminal, each solar cell module including an array of solar cells, the method comprising:
   controlling each first and second solar cell module so that electric power supplied by the first and second solar cell modules to the portable terminal is maximized;
   identifying a current orientation of the portable terminal in response to a change in orientation, and
   determining which of the first and second solar cell is facing vertically upward based on said identified orientation using an a state detection part comprising a mechanical form sensor, an acceleration sensor, or an illuminance sensor;
   deactivating an electric power control part of the corresponding solar cell module that is determined as not facing vertically upward, and
   activating the electric power control part of the corresponding solar cell module that is determined as not facing vertically upward using the determination result received from the state detection part.

5. A method for controlling electric power supply from first and second solar cell modules arranged on different surfaces of a casing of a portable apparatus, each first and second solar cell module including an array of solar cells, the method comprising:
- controlling each first and second solar cell module so that electric power supplied by the first and second solar cell modules to the portable apparatus is maximized;
- identifying a current orientation of the portable terminal in response to a change in orientation, and
- determining which of the first and second solar cell is facing vertically upward based on said identified orientation using an a state detection part comprising a mechanical form sensor, an acceleration sensor, or an illuminance sensor;
- deactivating an electric power control part of the corresponding solar cell module that is determined as not facing vertically upward, and
- activating the electric power control part of the corresponding solar cell module that is determined as not facing vertically upward using the determination result received from the state detection part.

* * * * *